United States Patent
Rak et al.

(10) Patent No.: US 8,449,208 B2
(45) Date of Patent: May 28, 2013

(54) RAMPED-KEY KEYBOARD FOR A HANDHELD MOBILE COMMUNICATION DEVICE

(75) Inventors: Roman P. Rak, Waterloo (CA); Jason T. Griffin, Kitchener (CA); Norman M. Ladouceur, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/431,219

(22) Filed: Mar. 27, 2012

(65) Prior Publication Data

US 2012/0190409 A1 Jul. 26, 2012

Related U.S. Application Data (63) Continuation of application No. 11/861,118, filed on Sep. 25, 2007, now Pat. No. 8,162,552.

(60) Provisional application No. 60/826,898, filed on Sep. 25, 2006.

(51) Int. Cl.
   *G06F 3/02* (2006.01)
   *H01H 13/14* (2006.01)

(52) U.S. Cl.
   CPC .............. *G06F 3/0202* (2013.01); *H01H 13/14* (2013.01)
   USPC .......................................... 400/490; 400/472

(58) Field of Classification Search
   CPC ... G06F 3/0202; H01H 2003/127; H01H 13/14
   USPC ....................... 400/472, 490–495.1, 496, 488
   See application file for complete search history.

(56) References Cited

U.S. PATENT DOCUMENTS

| | | | |
|---|---|---|---|
| 726,107 A | * | 4/1903 | Stanton ......................... 400/490 |
| 1,468,566 A | | 9/1923 | Hall |

(Continued)

FOREIGN PATENT DOCUMENTS

| | | | |
|---|---|---|---|
| BE | 1012689 A3 | * | 2/2001 |
| EP | 1094482 A2 | | 4/2001 |

(Continued)

OTHER PUBLICATIONS

Palm Treo 750v, announced Sep. 2006, http://www.gsmarena.com/palm_treo_750v-1704.php; 4 pages.

(Continued)

*Primary Examiner* — Daniel J Colilla
(74) *Attorney, Agent, or Firm* — Fitch, Even, Tabin & Flannery LLP (57) ABSTRACT

Wireless handheld mobile communication device and keyboard therefore having a keyfield including a plurality of depressible keys arranged in rows that are distributed about a vertical centerline (Vc) of the keyboard. Each depressible key has a top engagement surface with an upper inboard portion that is raised relative a lower outboard portion thereof. The top engagement surface of each depressible key is ramped from the lower outboard portion toward the upper inboard portion. Each top engagement surface is generally crest shaped, with the apex of the crest running generally diagonally across the respective key with a remaining surface falling away from the crest toward the upper outboard portion and the lower inboard portion of the key. The top engagement surface of each of the depressible keys terminates at an upper edge thereof in an elevated ridge down from which the balance of the respective top engagement surface slopes.

10 Claims, 8 Drawing Sheets

U.S. PATENT DOCUMENTS

| | | | |
|---|---|---|---|
| 4,029,915 A * | 6/1977 | Ojima | 708/145 |
| 5,046,739 A | 9/1991 | Reichow | |
| D356,788 S | 3/1995 | Mizusugi et al. | |
| D375,748 S | 11/1996 | Hartman | |
| D389,157 S | 1/1998 | Williams et al. | |
| D393,628 S | 4/1998 | Ledbetter et al. | |
| 5,898,933 A | 4/1999 | Kaschke | |
| D445,409 S | 7/2001 | Segers | |
| 6,370,018 B1 | 4/2002 | Miller, Jr. et al. | |
| 6,480,185 B1 | 11/2002 | Kiljander et al. | |
| D470,150 S | 2/2003 | Lewis, Jr. et al. | |
| D470,854 S | 2/2003 | Jones | |
| 6,571,086 B1 | 5/2003 | Uusimaki | |
| D480,057 S | 9/2003 | Ho-Cheun et al. | |
| 6,628,511 B2 | 9/2003 | Engstrom | |
| D480,391 S * | 10/2003 | Dalby et al. | D14/247 |
| 6,671,170 B2 | 12/2003 | Webb et al. | |
| D488,155 S | 4/2004 | Wilson | |
| D502,159 S | 2/2005 | Chan et al. | |
| 6,919,879 B2 | 7/2005 | Griffin et al. | |
| D509,493 S | 9/2005 | Winebrenner et al. | |
| 6,961,052 B1 | 11/2005 | Vaziri | |
| D519,502 S | 4/2006 | Hawkins et al. | |
| 7,050,764 B2 | 5/2006 | Carlson | |
| D524,803 S | 7/2006 | Tyneski et al. | |
| D527,001 S | 8/2006 | Pletikosa et al. | |
| D528,098 S | 9/2006 | Corley et al. | |
| D532,415 S | 11/2006 | Chen et al. | |
| D533,165 S | 12/2006 | Knight et al. | |
| D537,082 S | 2/2007 | Griffin | |
| D550,679 S | 9/2007 | Griffin et al. | |
| D553,136 S | 10/2007 | Rak et al. | |
| D556,207 S | 11/2007 | Griffin | |
| D559,223 S | 1/2008 | Kim et al. | |
| D562,332 S | 2/2008 | Rak et al. | |
| D563,415 S | 3/2008 | Griffin et al. | |
| D570,840 S | 6/2008 | Rak et al. | |
| 7,642,934 B2 | 1/2010 | Scott | |
| 7,694,231 B2 | 4/2010 | Kocienda et al. | |
| 7,898,526 B2 * | 3/2011 | Ladouceur et al. | 345/168 |
| 7,953,448 B2 | 5/2011 | Pletikosa et al. | |
| 8,162,552 B2 | 4/2012 | Rak et al. | |
| 2002/0041784 A1 * | 4/2002 | Thomas | 400/472 |
| 2002/0060518 A1 | 5/2002 | Duineveld et al. | |
| 2002/0063690 A1 | 5/2002 | Chung et al. | |
| 2002/0149566 A1 | 10/2002 | Sarkissian | |
| 2003/0067445 A1 | 4/2003 | Hirshberg et al. | |
| 2003/0083020 A1 * | 5/2003 | Langford | 455/90 |
| 2003/0201983 A1 | 10/2003 | Jokinen et al. | |
| 2004/0087333 A1 | 5/2004 | Hutchison et al. | |
| 2004/0105220 A1 | 6/2004 | Webb et al. | |
| 2004/0229663 A1 | 11/2004 | Tosey et al. | |
| 2005/0136853 A1 | 6/2005 | Lenchik et al. | |
| 2005/0190083 A1 | 9/2005 | Tyneski et al. | |
| 2005/0235021 A1 | 10/2005 | Chen et al. | |
| 2006/0062626 A1 | 3/2006 | Hamilton et al. | |
| 2006/0079292 A1 | 4/2006 | Carlson et al. | |
| 2006/0146026 A1 * | 7/2006 | Shim | 345/168 |
| 2006/0209032 A1 | 9/2006 | Chiang et al. | |
| 2007/0188462 A1 | 8/2007 | Lee et al. | |
| 2007/0234208 A1 | 10/2007 | Scott | |
| 2007/0238489 A1 | 10/2007 | Scott | |
| 2007/0259698 A1 | 11/2007 | Chen et al. | |
| 2007/0279388 A1 * | 12/2007 | Pletikosa et al. | 345/169 |
| 2008/0055253 A1 | 3/2008 | Moosavi et al. | |
| 2008/0101594 A1 | 5/2008 | Rak et al. | |
| 2009/0051658 A1 | 2/2009 | Frohlund | |
| 2009/0102799 A1 | 4/2009 | Moosavi et al. | |

FOREIGN PATENT DOCUMENTS

| | | | |
|---|---|---|---|
| EP | 000716238-0001 | | 4/2007 |
| GB | 2291837 A | * | 2/1996 |
| JP | 2003084887 A | | 3/2003 |
| JP | 2003288154 A | | 10/2003 |

OTHER PUBLICATIONS

BlackBerry Pearl 8100, announced Sep. 2006, http://www.gsmarena.com/blackberry_pearl_8100-1701.php; 5 pages.

BlackBerry Curve 8300, announced May 2007, http://www.gsmarena.com/blackberry_curve_8300-1979.php; 5 pages.

* cited by examiner

RAMPED-KEY KEYBOARD FOR A HANDHELD MOBILE COMMUNICATION DEVICE

CROSS REFERENCE

This application is a continuation of and claims the benefit of U.S. patent application Ser. No. 11/861,118, filed on Sep. 25, 2007, which application claims the benefit of U.S. Provisional Application No. 60/826,898, filed Sep. 25, 2006. Said applications are expressly incorporated herein by reference in its entirety.

FIELD

This disclosure relates to keyboards for handheld electronic devices, and more particularly to keyboards for handheld electronic devices, as well as the devices themselves, that have keys which include a turned-up or ramped corner that facilitates thumb typing.

BACKGROUND

The keyboard of a handheld electronic device, and more particularly, a handheld mobile communication device, can be used to enter text for sending messages electronically, as well as to dial phone numbers for voice calls. The keyboard for text entry can take many different forms including a keyboard in which all letters of the alphabet are shown on respective keys.

Handheld mobile communication devices can be used to send electronic mail and other data messages. Even though these devices have the ability to send text messages, the entry of text requires care to avoid striking unintended keys. Today, handheld mobile communication devices are being designed with smaller widths which present a challenge in designing a keyboard that is both easy to use and has large enough keys for the user. Use of the device is further complicated by the fact that users typically make use of their thumbs, the largest of the digits, for striking the keys. One problem the present disclosure appreciates and addresses is the fact that when the keys present a generally uniform top surface, it is easy to inadvertently press surrounding keys when an intended key is pressed using the user's thumb. Therefore, the solutions of this disclosure focus on designs that facilitate a particular key's depression, while avoiding inadvertent actuations of surrounding key(s).

DETAILED DESCRIPTION

It should be appreciated at the outset that while the instant disclosure describes one or more preferred embodiments of a ramped-key keyboard, such embodiments are presented solely for purposes of illustration and are not intended to be limitations on the scope of the disclosure.

The instant disclosure relates to handheld electronic devices and more particularly to mobile handheld communication devices comprising ramped-key keyboards. As used herein, the term "handheld electronic device" describes a relatively small electronic device that is capable of being held in a user's hand. "Handheld electronic device" is a broad term that includes devices further classified as handheld communication devices, and mobile handheld communications devices, which can interact with one or more communications networks to transmit and receive data of various types, e.g., text, voice, data, etc.

The ramped-key keyboard disclosed herein can be a full keyboard. A full keyboard refers to a keyboard on which all the keys of the alphabet are shown as indicia on the keys. Reference to a full keyboard in the remainder of the disclosure can be abbreviated as "keyboard." Furthermore, "keyboard" can also be used to refer to a ramped-key keyboard. The format of the indicia shown on the keys can comprise, for example, the letters A-Z in one of a standard keyboard layout and/or numerals as described later in this writing. Examples of different types of standard keyboard layouts include, but are not limited to: QWERTY, QWERTZ, AZERTY, and Dvorak layouts. In the embodiments disclosed, the keyboard is secured to the housing and the keys are located on the face side of the device.

In the alternative to comprising a full keyboard, the ramped-key keyboard can be configured to comprise a plurality of keys wherein alphabetic letters are associated with the keys, but at least a portion of the individual keys have multiple alphabetic letters associated therewith. This type of configuration is referred to as a reduced keyboard (in comparison to the full keyboard described immediately above) and can, among others comprise QWERTY, QWERTZ, AZERTY, and Dvorak layouts.

Generally, typing or inputting information on a handheld electronic device is typically performed by using the thumbs to strike the keys. The motion of the thumbs while holding a handheld electronic device is different when compared with the typical motion that a typist uses when using a standard sized keyboard, e.g., a typewriter, word processor, or keyboard that is attached to a computer. The fingers used to type on standard typewriters, word processing machines, e.g. desktop computers, or other data entry devices, typically involves holding the hands and fingers over a set of keys that make up a so-called home row of keys. Typing on a handheld electronic device, on the other hand, does not allow a user to use all of his/her fingers because the device is too small to accommodate the use of all of the fingers. Consequently, users of such handheld mobile communication/electronic devices are forced to employ a "hunt and peck" type style of entry, use their thumbs, or use some other type of entry that is different from the typical motion of a typist that uses a regularly sized keyboard. This condition is further aggravated by the use of smaller devices in which the keys of the keyboard are made smaller and/or closer to one another.

Additionally, the range of motion of the human thumb is different from that of the human fingers. Typing on a keyboard of a handheld mobile communication device can be described by the way the user strikes keys and holds the device. When the user desires to type on the handheld mobile communication device, the device is rested in one or more palm(s) of the user's hand(s) and the thumb(s) are used to perform the key striking.

Because of the large "footprint" of the thumb when typing on keys of these small keyboards, it is easy to actually be engaging two or more keys when only one is intended. Measures have previously been taken to minimize this effect. For example, the edges of the keys have been beveled so they are less likely to be engaged by an adjacent finger or thumb. In this manner, more clearance space is provided around a particular key thereby accommodating an engaging finger or thumb with less overlap on adjoining keys.

In the accompanying figures, a handheld electronic device is generally illustrated by reference numeral 300. Handheld electronic device 300, which can comprise a mobile communications device, is seen as comprising housing 12 having front side 14, rear side 16, top side 18, bottom side 20, right side 22 and left side 24. In the figures, handheld electronic device 300 is illustrated as further comprising a ramped-key keyboard 332 (which can be a QWERTY keyboard), an electronic graphical display 322 (which can be an illuminable LED display), input buttons 26 (which may be left and right "mouse," telephone buttons for initiating or ending a telephone call, function buttons, keyboard buttons, etc.), cursor navigation controller assembly 328 for navigating a cursor about the electronic graphical display and causing execution of a selected function to be performed, speaker 334, and microphone 336.

Figure 9:
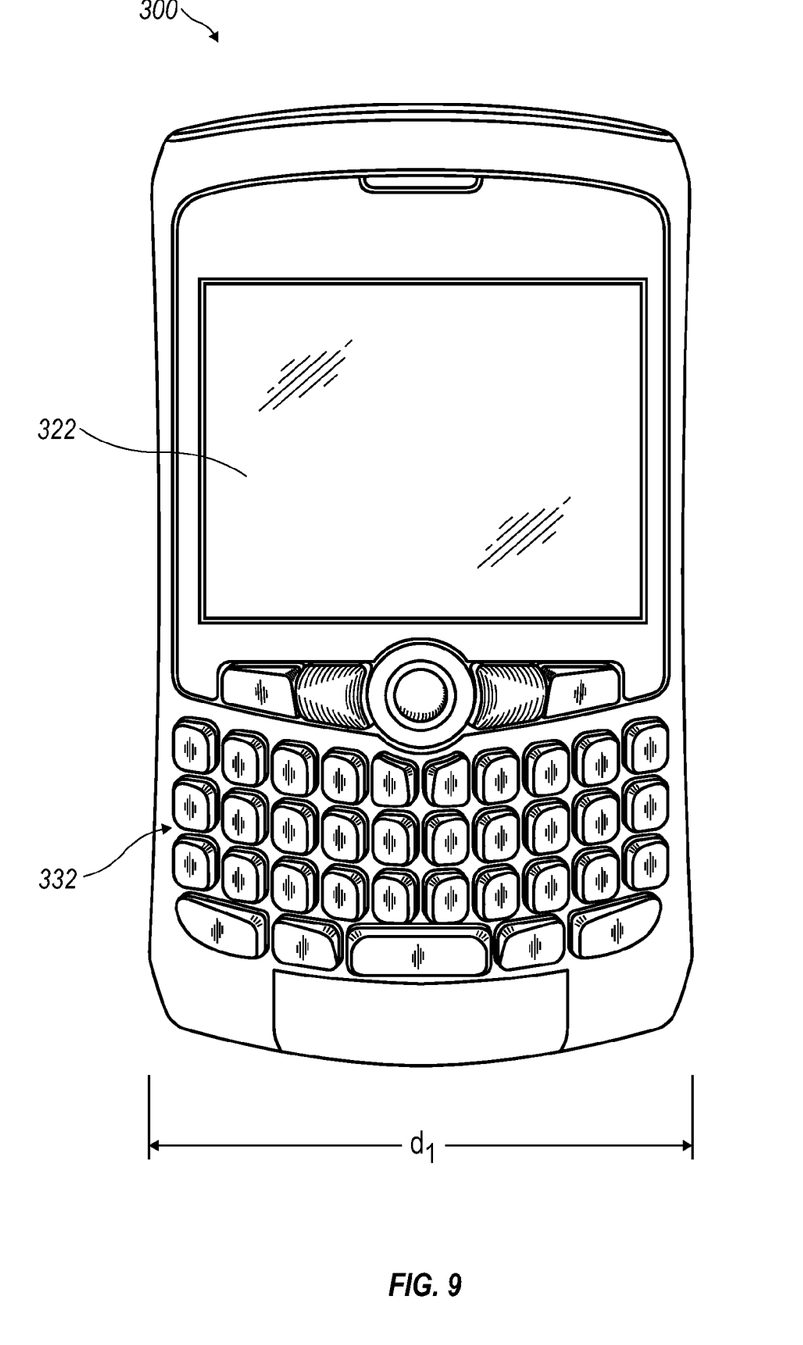
FIG. 9 is a front elevational view of the handheld mobile communication device of FIG. 8 demonstrating the width, $d_1$, of the device.

The handheld electronic device 300 can also comprise one or more inputs/outputs, for example, a USB port, for among other things, providing power to the device, charging a battery, or transferring data to/from another electronic device. The handheld electronic device has a width $D_1$, which is between 1 and 5 inches, and preferably between 2 and 3½ inches, and a height which is preferably between 2 and 5 inches (See FIG. 9).

Figure 1:
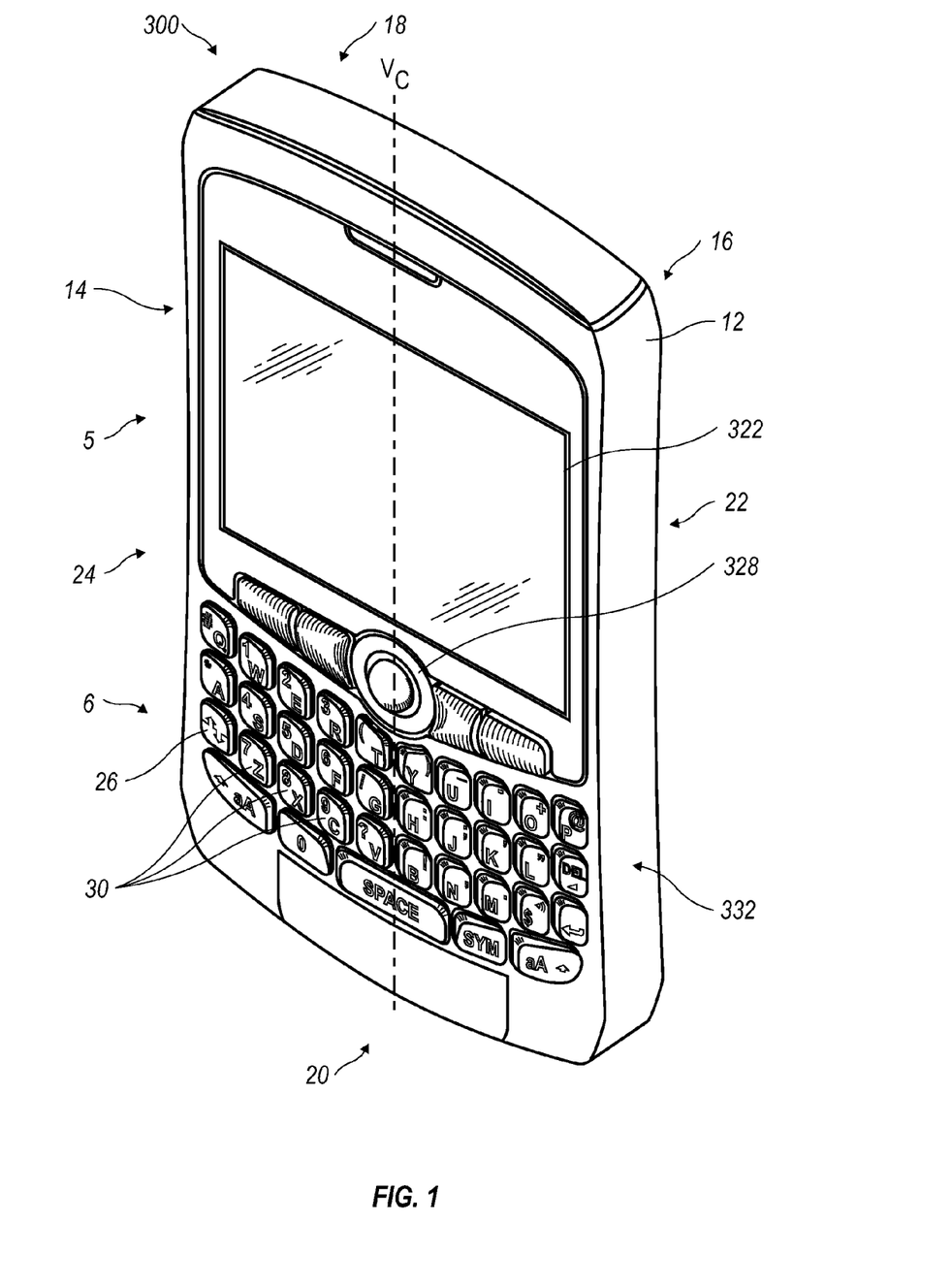
FIG. 1 is a perspective view of a handheld mobile communication (handheld electronic) device comprising a keyboard configured according to the teachings of the present disclosure.

As may be appreciated from FIG. 1, electronic display 322 is generally disposed above the ramped-key keyboard 332 and is suitable for accommodating textual input to the handheld electronic device 300 when in an operable configuration. Preferably, the electronic display 322 and keyboard 332 are disposed on the front side 14 of the handheld electronic device 300. As shown, the device 300 is of unibody construction, but it is also contemplated that the device may be of an alternative construction such as that commonly known as "clamshell," "flip-phone," "sliding," or "rotating" style. The navigation cursor control assembly 328 and keyboard 332 are each generally located below the electronic display 322.

Referring now to FIGS. 2-5, which illustrate the ramped-key keyboard 332 in more detail, the keyboard 332 is generally rectangular in appearance and spans a substantial entirety of the width $D_1$ of the device 300. Ramped-key keyboard 332 is bounded by top 36, bottom 38, left 40 and right 42 keyboard sides. Left 40 and right keyboard 42 sides are generally parallel with respect to one another, but can be otherwise. Top 36 and bottom 38 sides can be, alone or in combination, linear or arced and the arced sides can be concave, convex or combinations thereof. The ramped-key keys 30 and input keys 26 (function keys) of the keyboard predominantly extend from the left side 40 to the right side 42 of the keyboard and from the top side 36 to the bottom side 38 of the keyboard.

Figure 3:
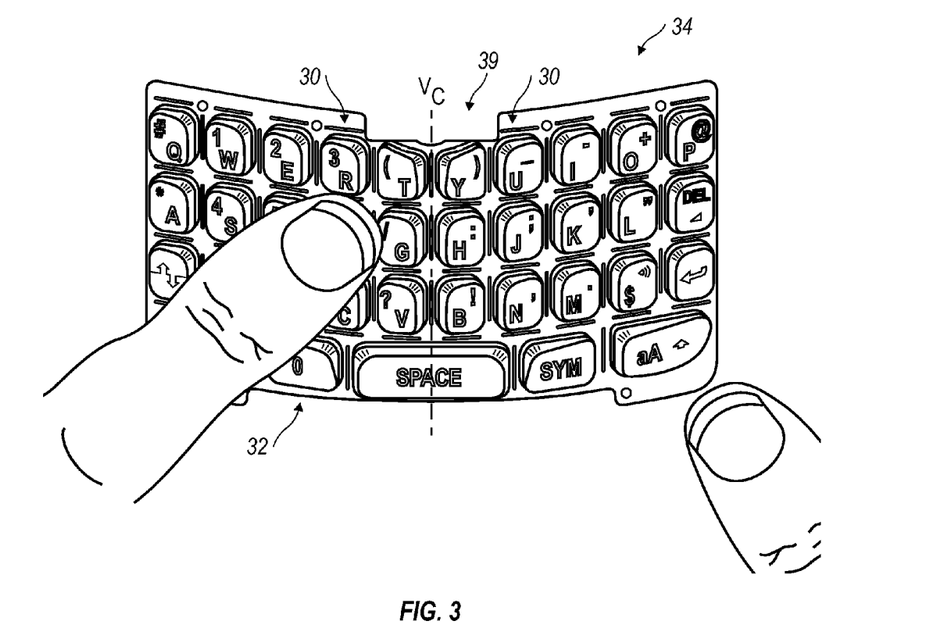
FIG. 3 is a front view of a flexible keyboard overlay for incorporation into a handheld mobile communication device showing a user's thumbs oriented relative thereto.

Generally, the keyboard 332 comprises a left-hand keyfield 32, which is located to the left of the vertical centerline $V_c$ of the housing, and a right-hand keyfield 34, which is located to the right of the vertical centerline $V_c$ of the housing (see FIG. 3).

In one contemplated configuration, the top surface of the ramped-keys is curved and resembles a cresting wave. The vertical portion of the wave basically provides an upturning wall against which the thumb engages when depressing the particular key. The very top of the wave is provided with a ridge that can be tactually sensed by the thumb, and the ridge also provides resistance to the thumb slipping over the top of the ramped-key. The top of the wave also provides an elevated portion to the key that can be engaged up above the rest of the key's surface.

The ramped-key is scalloped behind the wave portion, which is to say undercut slightly back toward the key body. In this way, the several surrounding keys collectively provide a clearance space around the target or central key thereby aiding actuation of only that target key while avoiding inadvertent actuation of those surrounding keys. This clearance zone establishes an enhanced actuation zone for the target key.

On keys of the right-hand keyfield 34, the left top corner contains the elevated wave portion. As an enhancement, the bottom right corner can be lowered or shaved down further enhancing the ramped nature of the key's top surface. For the keys of the left-hand keyfield, the configuration is mirrored. Because of the scallops, a top plan view of the key demonstrates that the elevated wave portion is not at the edge of the key, but in fact more centrally located with respect the top surface of the key.

Figure 2:
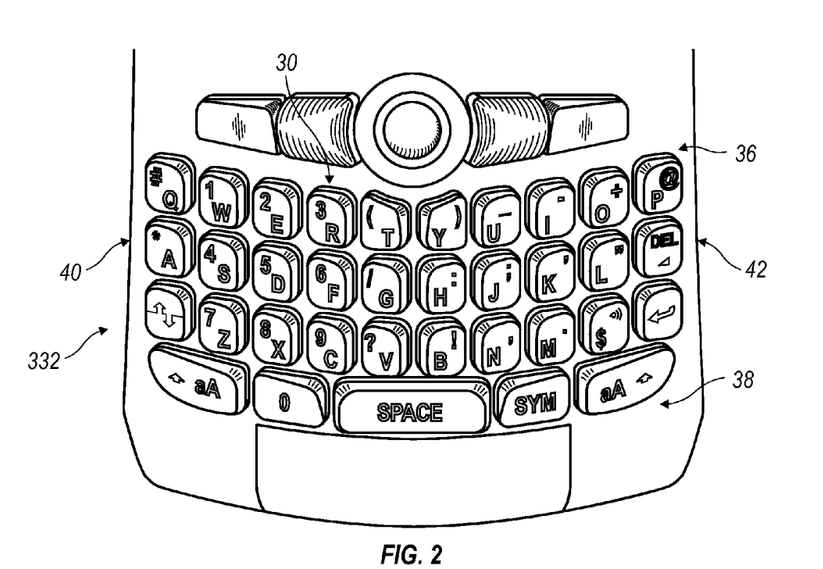
FIG. 2 is a front view of the lower front portion of the handheld mobile communication device of FIG. 1 including the keyboard.

Referring again to FIG. 3, the keyboard is depicted as a flexible overlay sheeting for incorporation into a wireless handheld mobile communication device as shown, for example, in FIG. 2. The keyboard comprises a keyfield comprising a plurality of depressible keys arranged in rows that are distributed about a vertical centerline (Vc) of the keyboard. Each of the depressible keys constituting the rows in the keyfield (but not necessarily all of the keys in total) has a top engagement surface 31 of which an upper inboard portion 43 is raised relative a lower outboard portion 45 thereof.

Figure 4:
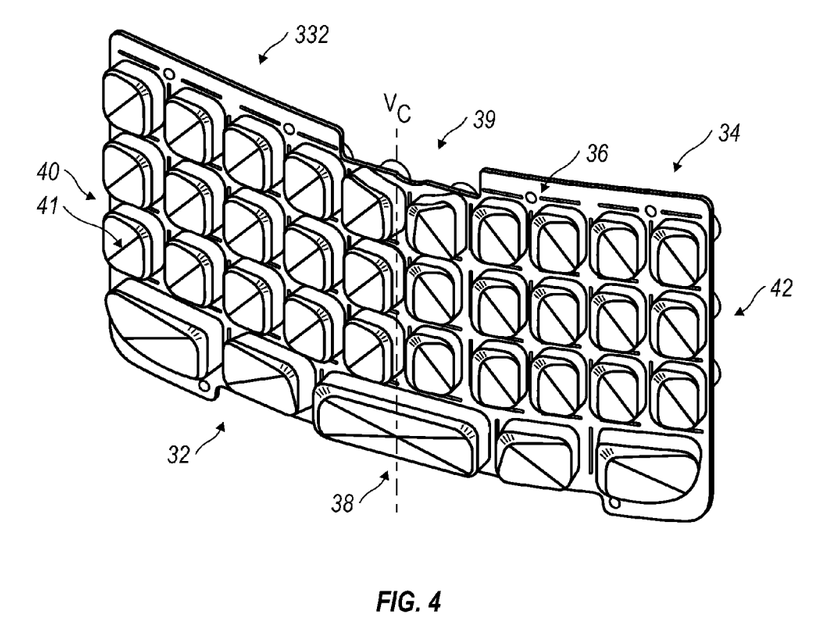
FIG. 4 is a perspective view of the flexible keyboard overlay of FIG. 3 without indicia.
Figure 4A:
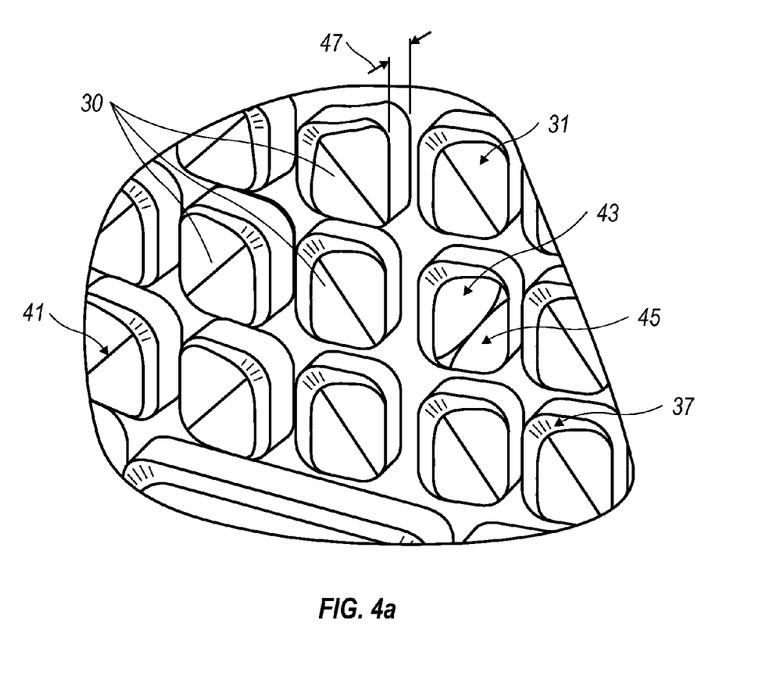
FIG. 4a is an expanded view of several keys of the keyboard of FIG. 3 located adjacent the vertical centerline (Vc)

As best illustrated in FIG. 4a, in one embodiment, each of the depressible keys has a top engagement surface 31 of which an upper inboard portion 43 is raised relative a lower outboard portion 45 thereof. The top engagement surface 31 of each of the depressible keys is ramped from the lower outboard portion 45 toward the upper inboard portion 43. Each top engagement surface 31 is generally crest shaped 41, with the apex of the crest running generally diagonally across the respective key with the rest of the top engagement surface 31 falling away from the crest toward the upper outboard portion and the lower inboard portion of the key, forming a diagonally oriented crest 41. Although the apex of the crest 41 is illustrated as straight in FIG. 4a, other embodiments in which the diagonally oriented crest is rounded or curved are within the scope of this disclosure.

As may also be appreciated in FIG. 4a, the top engagement surface 31 of each of the depressible keys terminates at an upper edge thereof in a diagonally running ridge 37 from which the balance of the respective top engagement surface 31 slopes. Further in this example, each of the depressible keys has an upper side surface 47 that slopes downward from the elevated ridge at a grade greater than any grade of the top engagement surface 31.

FIG. 3 aptly illustrates the keyfield comprising a right-hand keyfield 34 composed of a plurality of depressible keys located on a right-hand side of the vertical centerline of the device and a left-hand keyfield composed of a plurality of keys located on a left-hand side of the vertical centerline of the device. Each key of the plurality of keys located on the left-hand side of the vertical centerline has a top engagement surface that is lower-left-to-upper-right inclined and each key of the plurality of keys located on the right-hand side of the vertical centerline has a top engagement surface that is lower-right-to-upper-left inclined.

As is typified in FIGS. 1-2 and 8-11, the present disclosure is also directed toward a wireless handheld mobile communication device comprising a housing with a display located in a top portion 5 thereof for displaying information and a keyboard located in a lower portion 6 thereof below the display. In this regard, the keyboard is uniquely configured as described herein.

As depicted, the wireless handheld mobile communication device also includes an input device exemplified as a trackball that controls cursor movement on the display via the device's included microprocessor.

The keys comprising the keyfields can be of several shapes that include, but are not limited to: substantially trapezoidal and substantially parallelogram shaped (rectangular and non-rectangular) and possibly comprising arced side members to correspond with an arced side of the keyboard. Also the lengths and widths of the various keys can vary depending on a number of factors, e.g., width and height of the device, width and height of the keyboard, etc.; albeit the length of the keys will typically be greater than the width. In some embodiments, a navigation controller assembly 328, or other auxiliary I/O device, can be disposed proximate, or within a portion of the void 39.

The ramped keys 30 can be arranged such that the upper row of keys in the left-hand keyfield 32 are keys "Q", "W", "E", "R", and "T." Another lower row of keys in the left-hand keyfield 32 can be: "A", "S", "D", "F", and "G." Still further, an even lower row of keys can comprise the keys "ALT", "Z", "X", "C", and "V". While these rows are described in relation to a standard QWERTY key arrangement, other types of arrangements including, but not limited to, QWERTZ, AZERTY, or Dvorak are considered to be within the scope of this disclosure. Likewise, an upper row in the right-hand keyfield 34 can comprise keys with indicia corresponding to letters "Y", "U", "I", "O", and "P". Further, a lower row can be composed of the keys with indicia corresponding to letters "H", "J", "K", "L", and symbol "<". As mentioned above, these comprise embodiments of a standard QWERTY array, and other known arrays can be used instead and remain within the scope of this disclosure.

The indicia on the keys are provided so that the indicia generally appear uprightly oriented along an imaginary horizontal line that extends across a row of keys; the indicia can also appear along an arced imaginary line, if desired. The indicia can comprise alphabetic indicia as well as numeric indicia and/or other functions and symbols. The layout of the alphabetic indicia is generally provided to present the user with a familiar and easy to follow keyboard arrangement. The above described alphabetic indicia can be arranged in one of QWERTY, QWERTZ, AZERTY, and Dvorak layouts.

As illustrated in FIG. 3, when the keyboard is held in the palm(s) of a user's hand(s), the thumb(s) of the user are generally naturally diagonally oriented with respect to the housing and/or naturally diagonally oriented with respect to the vertical center $V_c$. The longitudinal axis of the user's right thumb is shown.

Figures 5, 6, 7:
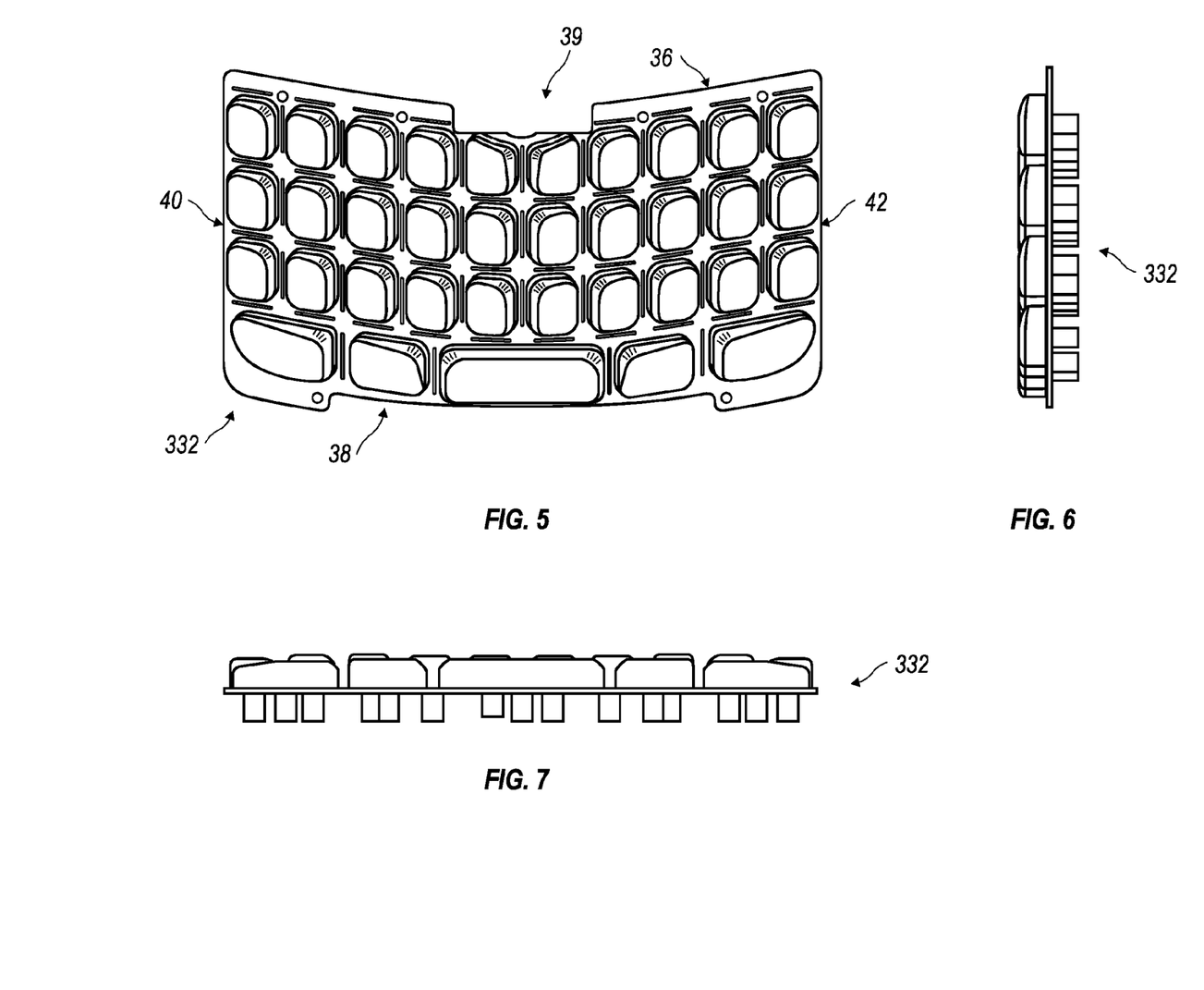
FIG. 5 is a front elevational view of the flexible keyboard overlay of FIG. 3.
FIGS. 6 and 7 are side (lateral and bottom, respectively) views of the flexible keyboard overlay of FIG. 3.
Figure 8:
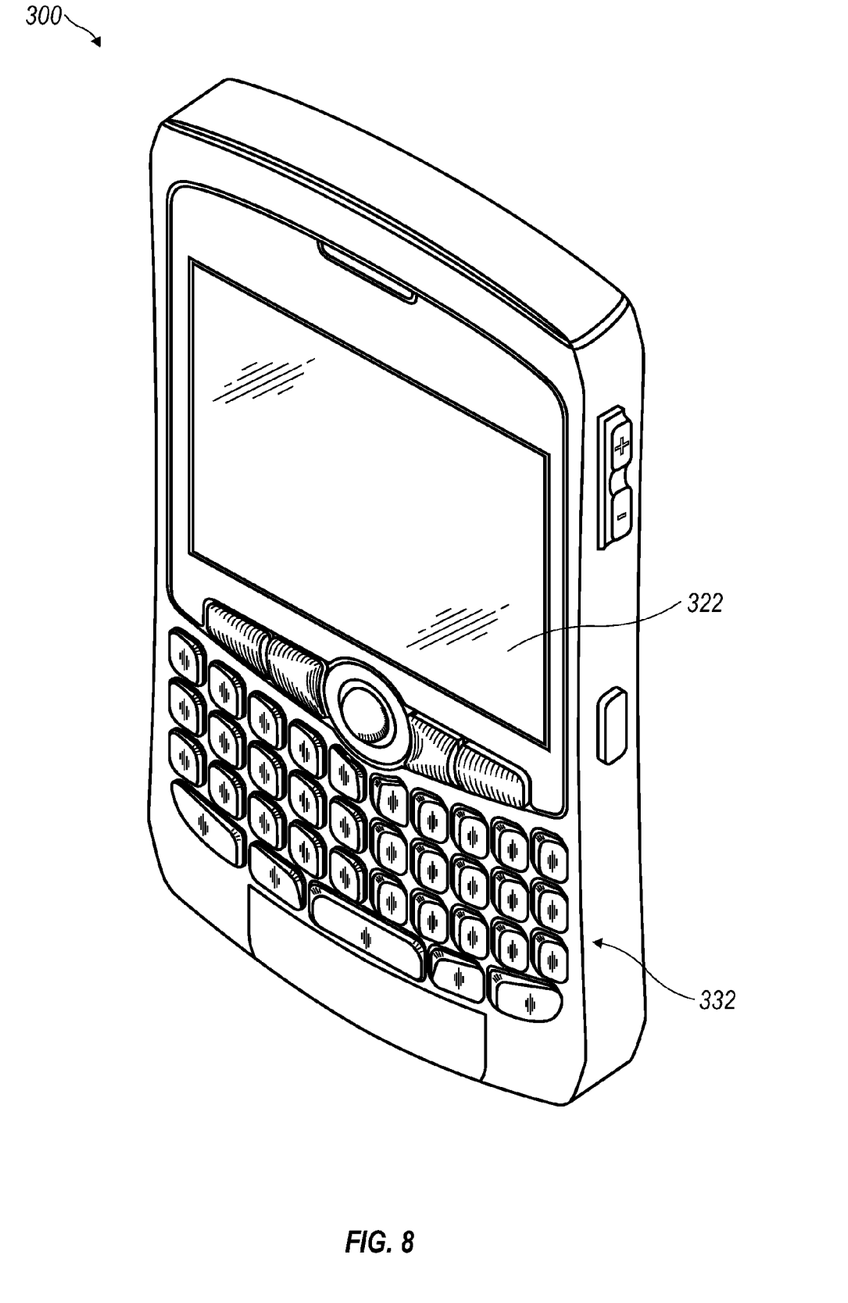
FIG. 8 is a perspective front view of an alternatively configured handheld mobile communication device according to this disclosure.

As shown in at least FIGS. 3-5, a void 39 is formed near the top row of the keyboard proximate the nexus of the left-hand keyfield 32 and right-hand keyfield 34. This void 39 is useful because it provides a natural location for accommodating a navigation controller assembly 328 (also known as an auxiliary I/O device), which can be useful for navigating a cursor on the electronic display 322, or for other purposes. The navigation controller assembly 328 can comprise several forms that include, but are not limited to: cursor keys, trackball, navigation wheel, joystick, touchpad, or barrel roller, among other types of auxiliary input devices. The location of the auxiliary I/O device 328 between the display 322 of the handheld communication device 300 and the ramped-key keyboard 332 provides the user with a familiar location for the navigation controller assembly 328. The void 39 provided by the nexus of the left-hand keyfield 32 and the right-hand keyfield 34 allows freedom of movement away from other keys on the keyboard. The size and shape of this void area 39 can vary depending on, among other things, the width $D_1$ and height $D_2$ of the handheld electronic device, the disposition of the top 36, bottom 38, left 40 and right 42 sides of the keyboard 328 (linear versus arcuate), key length, key width and the like.

The left and right-hand keyfields 32, 34 can be configured such that the ramped-key keys 30 are bound by one or more input keys 26 to form the top side 36 and bottom side 38 of the keyboard. Preferably, the input keys 26 forming the top side 36 and bottom side 38 of the keyboard comprise one or more function keys; e.g., CALL SEND, CALL END, ALT, SPACEBAR, RETURN, BACKSPACE, SYMBOL, or SHIFT keys and the like. In some embodiments, the function keys can be integrated with the keys of the left and right-hand keyfields. Alternatively, the function keys can be located above or below the left and right-hand keyfields and can be arranged to form a generally horizontal line. In other embodiments, the function keys can comprise arced sides or can be aligned substantially along arcs to thereby form convex or concave top sides 36 and bottom sides 38. The arcs forming the top and bottom sides can be identical, or different from one another and different arrangements of the function keys are described in relation to several figures.

Figure 11:
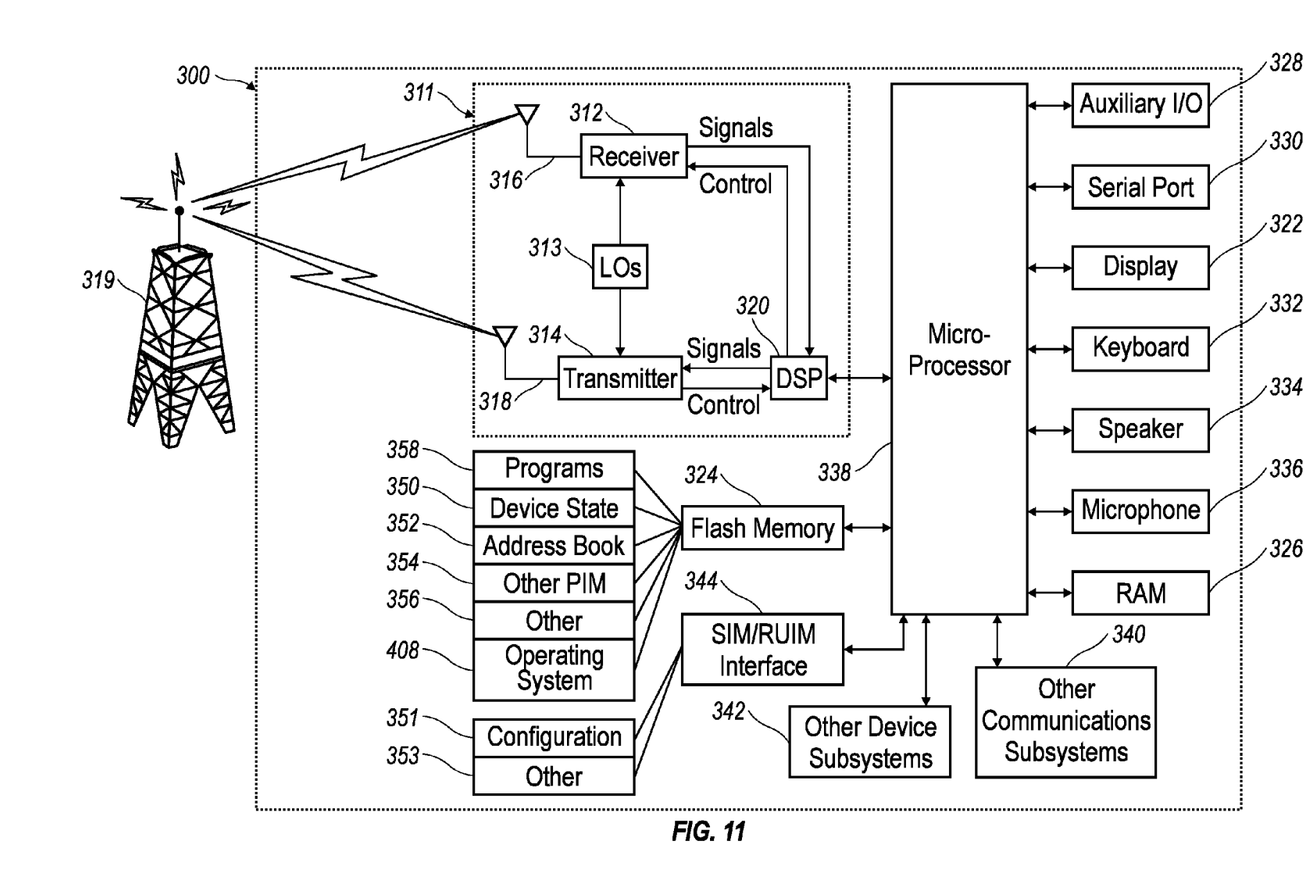
FIG. 11 is a block diagram representing a wireless handheld communication device interacting in a communication network.

As shown in FIG. 11, the handheld electronic device is capable of various forms of communication and the arrangement of keyboard 332 encourages efficient and ergonomic typing. This arrangement enables user's to send text messages that can take many forms including electronic mail messages. In a preferred embodiment, the handheld electronic device is equipped to communicate with a wireless system to allow a user to place telephone calls. In addition to comprising a plurality of keys corresponding to letters of the alphabet, the keyboard 332 can also be configured to comprise a standard telephone keypad layout as an overlay of indicia on some of the keys in the left-hand keyfield, or right-hand keyfield. Such configuration allows for efficient use of both text and voice communication modes.

The various characters, commands and functions associated with keyboard typing, in general, are traditionally arranged using various conventions. The most common of these in the United States, for instance, is the QWERTY keyboard layout. Others include the QWERTZ, AZERTY, and Dvorak keyboard configurations.

The QWERTY keyboard layout is the standard English-language alphabetic key arrangement 44. In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878.

The QWERTZ keyboard layout is normally used in German-speaking regions. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

The AZERTY keyboard layout is normally used in French-speaking regions. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Alphabetic key arrangements in full keyboards and typewriters are often presented along with numeric key arrangements. An exemplary numeric key arrangement is shown wherein the numbers 1-9 and 0 are positioned above the alphabetic keys. In another numeric key arrangement, numbers share keys with the alphabetic characters, such as for example, the top row of the QWERTY keyboard. A numeric phone key arrangement 45 is shown in the figures.

It is desirable for handheld electronic devices 300 to include a combined text-entry keyboard and a telephony keyboard. Examples of such mobile communication devices include mobile stations, cellular telephones, wireless personal digital assistants (PDAs), two-way paging devices, and others. Various keyboards are used with such devices depending in part on the physical size of the handheld electronic device. Some of these are termed full keyboard, reduced keyboard, and phone key pads.

In embodiments of the handheld electronic device 300 having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

Other embodiments can comprise a full keyboard for alphabetic characters and incorporate a combined numeric keyboard. In this embodiment, numeric characters share keys with alphabetic characters on the top row of the QWERTY keyboard. In the illustrated embodiment, the numeric characters share keys with alphabetic characters on the left side of the keyboard.

Examples of handheld electronic devices having a full keyboard assembly are also described in U.S. Pat. Nos. 6,278, 442 and 6,891,529, the disclosures of which are incorporated herein by reference in their entireties.

Further aspects of the environments, devices and methods of employment described hereinabove are expanded upon in the following details. An exemplary embodiment of the handheld electronic device 300 as shown is cradleable in one or more palm(s) the palm of a user's hand. The size of the device 300 is such that a user is capable of operating the device using the same hand that is holding the device. In an embodiment, the user is capable of actuating all features of the device 300 using a single thumb of the cradling hand. In an embodiment, the handheld device 300 features a keyboard 332 on the face of the device 300, which keyboard is actuable by the thumb of the hand cradling the device 300. As intimated in FIG. 3, the user may also hold the device 300 in such a manner to enable two thumbs to type on the device 300. Furthermore, the user may use fingers rather than thumbs to actuate the keys on the device 300. In order to accommodate palm-cradling of the device 300 by the average person, the length, or height, of the device, $D_2$, is generally greater than the width $D_1$, and the width is preferably between approximately two and three inches, but by no means limited to such dimensions.

The handheld electronic device 300 includes an input portion and an output display portion. The output display portion can be a display screen 322, such as an LCD or other similar display device.

Among the physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

Figure 10:
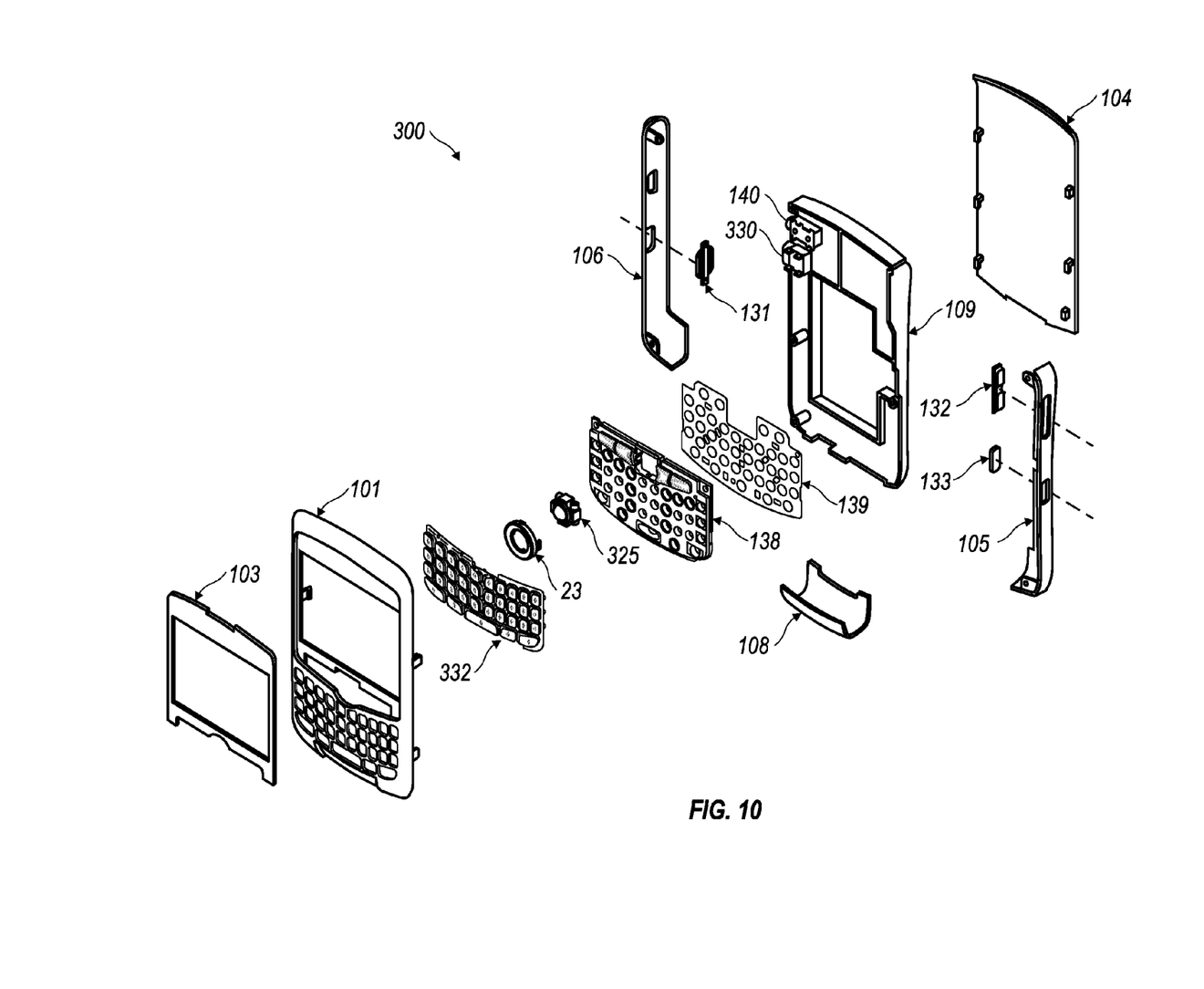
FIG. 10 is an exploded perspective view of an exemplary wireless handheld electronic device incorporating an keyboard configured according to the present disclosure.

An exemplary handheld electronic device 300 is shown in the assembly drawing of FIG. 10 and its cooperation in a wireless network is exemplified in the block diagram of FIG. 11. These figures are exemplary only, and those persons skilled in the art will appreciate the additional elements and modifications necessary to make the device work in particular network environments.

Integration of the trackball assembly into handheld device 300 can be seen in the exploded view of FIG. 10 showing some of the typical components found in the assembly of the handheld electronic device 300. The construction of the device benefits from various manufacturing simplifications. The internal components are predominantly constructed on a single PCB (printed circuit board, not illustrated). The keyboard 332 in one of the presently described embodiments is constructed from a single piece of material, and in some embodiments is made from plastic. While in another embodiment, the keyboard 332 can be constructed from a film on plastic technology allowing the plastic keyboard to be labeled with the desired alphanumeric arrangements as described herein. In at least one embodiment, the keyboard 332 is flexible allowing each individual key to move substantially independent from the other keys on the keyboard 332.

In one of the presently described embodiments, the keyboard 332 is assembled as part of a user input subassembly. The user input subassembly at least includes a lightguide panel 138 constructed of light diffusing material. The user subassembly optionally includes a navigational tool (examplary a trackball navigational tool 325) and a dome sheet 139. The keyboard 332 can be attached to a front surface of the lightguide panel 138. Additionally a dome sheet 139 can be mounted on the back surface of the lightguide panel 138 for receiving input from the keyboard 332 through the lightguide panel 138. The dome sheet 139 is in communication with the PCB (not shown) allowing for communication of a user selected key on the keyboard 332. The dome sheet 139 in at least one embodiment provides for switches that relay information to the PCB, and while in the presently described examplary embodiment one switch is provided for every key on the keyboard 332, in other embodiments more than one switch or less than one switch per key are provided.

In at least one embodiment, the PCB is equipped with at least one concentrate light source that emits light to the back surface of the lightguide panel 138. The portion of the back surface of the lightguide panel 138 that receives the concentrate light can aptly be described as a light-entrance surface are of the back surface of the lightguide panel 138. Furthermore, when the user input subassembly is constructed using a dome sheet 139, apertures can be provided in the dome sheet 138 to allow the at least one concentrate light source to be transmitted to the lightguide panel 138. The lightguide panel 138 is constructed to diffuse the light from the at least one concentrate light source to diffuse and be emitted through at least a portion of the front surface of the lightguide panel. The light source in at least one embodiment is a light emitting diode (LED). When the PCB is provided with a plurality of concentrate light sources, these light sources can be a plurality of LEDs.

In one embodiment, the trackball navigational tool assembly further comprises a lock ring 23 that at least partially surrounds the trackball navigational tool 325. The lock ring 23 like the trackball navigation tool can include a securement feature such as a barbed insert or a ramped insert that is capable of being snap-engaged or press-fit into the corresponding securement feature formed at the surface of the lightguide panel 138. These interfaces on the lock ring 23 likewise establish a releaseable interference connection and a releasable friction connection, respectively, between the trackball navigational tool assembly and the lightguide panel 138.

The user input subassembly is mountable within the handheld electronic device to the back support frame 109. The user input subassembly can be assembled using one or more of the above described components such that a user interface such as a keyboard and/or navigational tool are provided to the user of the handheld device 300 on the front face thereof.

The user input subassembly allows for various keypads such as keyboard 332 to be placed in communication with the lightguide panel 138. This allows the user or manufacturer to exchange the keyboard 332 according to the desired alphabetic arrangement of the particular region the handheld device 300 is shipped. Likewise, the user input subassembly can be integrated into varying support frames such as the one described herein or others in which proper connection and support is provided for the lightguide panel 138. These features allow for a single user input subassembly to be replaced as necessary as well.

A front housing cover 101 is mounted over the keyboard 332 and lightguide 138. The front housing cover 101 is constructed to allow the keyboard 332 to be accessible through at least one apperature (not shown) or a plurality of apertures corresponding to one or more keys and/or navigational tool depending on the configuration of the keyboard 332 and navigational tool such as the trackball navigational tool 325. The front housing cover 101 also provides an attachment point for the lens 103. A lens 103 covers the display, which is typically mounted on the PCB, to prevent damage. When assembled, the front housing cover 101 and the PCB are fixedly attached to each other and the display is positioned between the PCB and the front housing cover 101.

The trackball navigation tool 325 can be frictionally engaged with the front housing cover 101, and in one examplary embodiment the trackball navigation tool 325 is removable when the device is assembled. This allows for replacement of the trackball navigation tool 325 if/when it becomes damaged or the user desires replacement with a different type of trackball navigation tool 325. Other multidirectional navigation tools such as joysticks, four-way cursors, or touch pads are also considered to be within the scope of this disclosure. The removal of the trackball navigation tool 325 is enabled through the use of an outer removable ring 23, the outer edge of which defines the periphery of the trackball navigation tool 325. The ring 23 ensures that the trackball navigation tool 325 is properly held in place against the light guide 138.

A serial port (preferably a Universal Serial Bus port) 330 and an earphone jack 140 are fixedly attached to the PCB and further held in place by left side element 106. Buttons 131-133 may be attached to switches (not shown) which are connected to the PCB 12.

Final assembly involves placing a bottom piece 108 in contact with front housing cover 101 and back support frame 109. Furthermore, the assembly interconnects right side element 105 and left side element 106 with the front housing cover 101, bottom piece 108, back support frame 109, PCB, and lens 103. These side elements 105, 106 provide additional protection and strength to the support structure of the device 300. In the presently described exemplary embodiment, backplate 104 is removably attached to the back support frame 109.

The block diagram of FIG. 11, represents an embodiment of handheld electronic device 300 interacting in a communications network 319, and illustrates the use of a microprocessor 338 to control operation of the device 300. In FIG. 11, communication subsystem 311 performs all communication transmission and reception with wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUETOOTH™ communication module or an infrared device and associated circuits and components. Additionally, the microprocessor 338 is capable of performing operating system 408 functions and can enable execution of software applications on the communication device 300.

The above described auxiliary I/O subsystem 328 can take a variety of different subsystems including the above described cursor navigation assembly 328. As previously mentioned, the cursor navigation assembly (also known as a navigation tool) 328 is an ergonomic cursor navigation controller. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure.

In a preferred embodiment, the handheld electronic device 300 is designed to wirelessly connect with a communication network 319. Some communication networks that the handheld electronic device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, a flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the MOBITEX mobile communication system, DATATAC mobile communication system, the GPRS (General Packet Radio Service) network, the UMTS (Universal Mobile Telecommunication Service) network, the EDGE (Enhanced Data for Global Evolution) network, and the CDMA (Code Division Multiple Access) network.

For the systems listed above, the communication device 300 must be properly enabled to transmit and receive signals from the communication network 319. Other systems may not require such identifying information. MOBITEX and DATATAC mobile communication systems feature a unique identification code that is associated with each handheld electronic device 300. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different handheld electronic devices 300. Handheld electronic device 300 can be configured to operate some features without a SIM/RUIM card, but it may not be able to communicate with the network 319. In some locations, the handheld electronic device 300 can be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled handheld electronic communications device 300, two-way communication between the handheld electronic device 300 and communication network 319 is possible.

If the handheld electronic device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae 316, 318 in another preferred embodiment are combined into a single antenna (not shown). As one skilled in the art would appreciate, the antenna or antennae 316, 318 in another embodiment are externally mounted on the device 300.

When equipped for two-way communication, the handheld electronic device 300 features a communication subsystem 311. As is well known in the art, this communication subsystem 311 is modified so that it can support the operational needs of the device 300. The subsystem 311 includes a transmitter 314 and receiver 312 including the associated antenna or antennae 316, 318 as described above, local oscillators (LOs) 313, and a processing module 320 which in a preferred embodiment is a digital signal processor (DSP) 320.

A signal received by the handheld electronic device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, and preferably an alphanumeric keyboard is used to compose the email message. In a preferred embodiment, an auxiliary I/O device 328 is used in addition to the keyboard 332.

While the above has been described in relation to email messages, one skilled in the art can modify the procedures to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding handheld electronic devices 300 and wireless handheld communication devices 300 as well as the communication networks within which they cooperate. It should be appreciated, however, that a focus of the present disclosure is the enablement of a ramped-key keyboard for a handheld electronic device.

What is claimed is:

1. A keyboard for a wireless handheld mobile communication device, the keyboard comprising:
    a keyfield comprising a plurality of depressible keys arranged in rows that are distributed about a vertical centerline of the keyboard; and
    each of the depressible keys has a top engagement surface having a single centrally-disposed diagonal ridge of which:
        a first portion slopes downwardly to an edge of the top engagement surface from a centrally-disposed diagonal ridge; and
        a second portion slopes downwardly to another edge of the top engagement surface from the centrally-disposed diagonal ridge;
    wherein the centrally-disposed diagonal ridges for a plurality of the depressible keys on a first side of the vertical centerline of the keyboard are similarly aligned to one another at a first angle and the centrally-disposed diagonal ridges for a plurality of the depressible keys on a second side of the vertical centerline of the keyboard are similarly aligned to one another at a second angle, which second angle is different from the first angle.

2. The keyboard of claim 1 wherein the centrally-disposed diagonal ridge for at least one of the depressible keys has an upper portion that is directed towards the vertical centerline of the keyboard.

3. The keyboard of claim 2 wherein the centrally-disposed diagonal ridge is directed towards the vertical centerline of the key board at other than a perpendicular angle.

4. The keyboard of claim 2 wherein at least a majority of all depressible keys that comprise the keyboard have the centrally-disposed diagonal ridge.

5. The keyboard of claim 4 wherein all of the depressible keys that comprise the keyboard have the centrally-disposed diagonal ridge.

6. A keyboard for a wireless handheld mobile communication device, the keyboard comprising:
a keyfield comprising a plurality of depressible keys arranged in rows that are distributed about a vertical centerline of the keyboard; and
each of the depressible keys has a top engagement surface of which:
a first portion slopes downwardly to an edge of the top engagement surface from a centrally-disposed diagonal ridge; and
a second portion slopes downwardly to another edge of the top engagement surface from the centrally-disposed diagonal ridge;
wherein:
the centrally-disposed diagonal ridges for a plurality of the depressible keys on a first side of the vertical centerline of the keyboard are similarly aligned to one another at a first angle and the centrally-disposed diagonal ridges for a plurality of the depressible keys on a second side of the vertical centerline of the keyboard are similarly aligned to one another at a second angle, which second angle is different from the first angle; and
at least one of:
the first portion comprises an upper inboard portion of the top engagement surface; and
the second portion comprises a lower outboard portion of the top engagement surface.

7. A keyboard for a wireless handheld mobile communication device, the keyboard comprising:
a keyfield comprising a plurality of depressible keys arranged in rows that are distributed about a vertical centerline of the keyboard, wherein the keyfield further comprises:
a right-hand keyfield composed of a plurality of the depressible keys that are located on a right-hand side of the vertical centerline of the device, wherein the centrally-disposed diagonal ridge for at least some of the right-hand keyfield depressible keys is inclined from lower right to upper left; and
a left-hand keyfield composed of a plurality of keys located on a left-hand side of the vertical centerline of the device, wherein the centrally-disposed diagonal ridge for at least some of the left-hand keyfield depressible keys is inclined from lower left to upper right; and
each of the depressible keys has a top engagement surface having a single centrally-disposed diagonal ridge of which:
a first portion slopes downwardly to an edge of the top engagement surface from a centrally-disposed diagonal ridge; and
a second portion slopes downwardly to another edge of the top engagement surface from the centrally-disposed diagonal ridge.

8. The keyboard as recited in claim 7, wherein:
the centrally-disposed diagonal ridge for all of the right-hand keyfield depressible keys is inclined from lower right to upper left; and
the centrally-disposed diagonal ridge for all of the left-hand keyfield depressible keys is inclined from lower left to upper right.

9. A wireless handheld mobile communication device comprising:
a housing with a display located in a top portion thereof for displaying information; and
a keyboard located in a lower portion thereof below the display and wherein the keyboard comprises:
a keyfield comprising a plurality of depressible keys arranged in rows that are distributed about a vertical centerline of the keyboard;
wherein each of the depressible keys has a top engagement surface having a single centrally-disposed diagonal ridge of which:
a first portion slopes downwardly to an edge of the top engagement surface from a centrally-disposed diagonal ridge; and
a second portion slopes downwardly to another edge of the top engagement surface from the centrally-disposed diagonal ridge;
wherein the centrally-disposed diagonal ridges for depressible keys on a first side of the vertical centerline of the keyboard are similarly aligned to one another at a first angle and the centrally-disposed diagonal ridges for depressible keys on a second side of the vertical centerline of the keyboard are similarly aligned to one another at a second angle, which second angle is different from the first angle.

10. The wireless handheld mobile communication device as recited in claim 9, wherein the plurality of depressible keys have letter indicia arranged in a QWERTY format associated therewith.

* * * * *